(12) United States Patent
Gomadam

(10) Patent No.: US 9,020,058 B2
(45) Date of Patent: Apr. 28, 2015

(54) PRECODING FEEDBACK FOR CROSS-POLARIZED ANTENNAS BASED ON SIGNAL-COMPONENT MAGNITUDE DIFFERENCE

(71) Applicant: Marvell World Trade Ltd., St. Michael (BB)

(72) Inventor: Krishna Srikanth Gomadam, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 12 days.

(21) Appl. No.: 13/669,476

(22) Filed: Nov. 6, 2012

(65) Prior Publication Data

US 2013/0114654 A1   May 9, 2013

Related U.S. Application Data

(60) Provisional application No. 61/556,752, filed on Nov. 7, 2011.

(51) Int. Cl.
*H04B 7/02* (2006.01)
*H04L 1/02* (2006.01)
(Continued)

(52) U.S. Cl.
CPC ............ *H04B 7/0634* (2013.01); *H04B 7/0639* (2013.01); *H04B 7/0641* (2013.01); *H04B 7/065* (2013.01); *H04B 7/10* (2013.01)

(58) Field of Classification Search
CPC .. H04B 10/532; H04B 7/0469; H04B 7/0417; H04B 10/5055; H04B 7/0456; H04L 25/03343

USPC ................... 375/260, 267, 296, 297; 455/69
See application file for complete search history.

(56) References Cited

U.S. PATENT DOCUMENTS 5,231,629 A    7/1993  Kotzin et al.
5,263,160 A   11/1993  Porter, Jr. et al.
(Continued)

FOREIGN PATENT DOCUMENTS

EP    2182754 A1    5/2010
GB    2456217 A     7/2009
(Continued)

OTHER PUBLICATIONS

U.S. Appl. No. 12/477,152 Official Action dated Jun. 26, 2012.
(Continued)

*Primary Examiner* — Curtis Odom

(57) ABSTRACT

A method includes receiving in a mobile communication terminal from a base station a precoded Multiple-Input Multiple-Output (MIMO) signal, which includes a first signal component transmitted by one or more first antennas of the base station at a first polarization, and further comprises a second signal component transmitted by one or more second antennas of the base station at a second polarization, different from the first polarization. A difference between respective signal magnitudes of the first signal component having the first polarization and the second signal component having the second polarization that have been received in the terminal is estimated in the terminal. Feedback information, which requests the base station to precode subsequent MIMO signals with a precoding matrix that is specified as a function of the difference between the signal magnitudes, is calculated and transmitted from the terminal.

20 Claims, 2 Drawing Sheets

(51) Int. Cl.
*H04B 7/06* (2006.01)
*H04B 7/10* (2006.01)

(56) References Cited

U.S. PATENT DOCUMENTS

| | | |
|---|---|---|
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0240274 A1 | 10/2008 | Han et al. |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0052405 A1 | 2/2009 | Ko et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1 | 10/2009 | Chang et al. |
| 2009/0252333 A1 | 10/2009 | Chang et al. |
| 2009/0274225 A1 | 11/2009 | Khojastepour et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshno et al. |
| 2010/0296603 A1 | 11/2010 | Lee et al. |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1* | 4/2011 | Jongren et al. ............ 375/267 |
| 2011/0085610 A1 | 4/2011 | Zhuang et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0150052 A1 | 6/2011 | Erell et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2011/0310752 A1 | 12/2011 | Kim et al. |
| 2012/0002568 A1 | 1/2012 | Tiirola et al. |

(56) References Cited

U.S. PATENT DOCUMENTS

| | | | |
|---|---|---|---|
| 2012/0020433 A1 | 1/2012 | Bhattad et al. | |
| 2012/0033592 A1 | 2/2012 | Kim et al. | |
| 2012/0033630 A1 | 2/2012 | Chung et al. | |
| 2012/0039369 A1* | 2/2012 | Choi et al. | 375/219 |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0076028 A1 | 3/2012 | Ko et al. | |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0219042 A1 | 8/2012 | Onggosanusi et al. | |
| 2012/0219083 A1 | 8/2012 | Tong et al. | |
| 2012/0250550 A1 | 10/2012 | Gomadam et al. | |
| 2012/0257664 A1 | 10/2012 | Yue et al. | |
| 2012/0275376 A1 | 11/2012 | Sampath et al. | |
| 2012/0275386 A1 | 11/2012 | Frenne et al. | |
| 2012/0281620 A1 | 11/2012 | Sampath et al. | |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0089158 A1* | 4/2013 | Wu et al. | 375/267 |
| 2013/0107916 A1 | 5/2013 | Liu et al. | |
| 2013/0176991 A1 | 7/2013 | Yi | |
| 2013/0182786 A1 | 7/2013 | Frenne et al. | |

FOREIGN PATENT DOCUMENTS

| | | |
|---|---|---|
| JP | 2008236222 A | 2/2008 |
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008085096 A1 | 7/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
JP Patent Application # 2011-544111 Official Action dated Nov. 6, 2012.
U.S. Appl. No. 13/672,727, filed Nov. 9, 2012.
U.S. Appl. No. 13/669,477, filed Nov. 6, 2012.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
U.S. Appl. No. 61/585,556, filed Jan. 11, 2012.
U.S. Appl. No. 12/965,878 Office Action dated Oct. 24, 2013.
U.S. Appl. No. 13/052,075 Notice of Allowance dated Nov. 8, 2013.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.

(56) References Cited

OTHER PUBLICATIONS

Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
CATT, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.

Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
U.S. Appl. No. 13/543,835 Office Action dated Nov. 22, 2013.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.

(56) References Cited

OTHER PUBLICATIONS

Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
JP Patent Application # 2011-551560 Office Action dated Oct. 29, 2013.
JP Patent Application # 2012-506601 Office Action dated Oct. 22, 2013.
NTT Docomo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT Docomo, 3GPP TSG RAN WG1, "Views on Scalable CSI Feedback for DL CoMP in LTE-Advanced", Meeting #58bis, R1-094243, pp. 1-5, Oct. 12-16, 2009.
U.S. Appl. No. 13/669,477 Official Action dated Apr. 14, 2014.
Ericsson, "On the use of pre-coding in E-UTRA", 3GPP TSG RAN WG1 # 47, 3 pages, Riga, Latvia, Nov. 6-10, 2006.
Chinese Patent Application 201080057652.9 Office Action dated Apr. 1, 2014.
U.S. Appl. No. 14/215,093 Office Action dated Oct. 16, 2014.
European Application # 11154002.7 Search Report dated Sep. 19, 2014.
JP Application # 2013-146952 Office Action dated Jul. 29, 2014.
Ericsson., "Precoding Considerations in LTE MIMO Downlink", TSG-RAN WGl1 #47bis, 12 pages, Sorrento, Italy, Jan. 15-19, 2007.
U.S. Appl. No. 12/965,878 Notice of Allowance dated Feb. 10, 2014.

* cited by examiner

PRECODING FEEDBACK FOR CROSS-POLARIZED ANTENNAS BASED ON SIGNAL-COMPONENT MAGNITUDE DIFFERENCE

CROSS-REFERENCE TO RELATED APPLICATIONS

This application claims the benefit of U.S. Provisional Patent Application 61/556,752, filed Nov. 7, 2011, whose disclosure is incorporated herein by reference.

FIELD OF THE DISCLOSURE

The present invention relates generally to wireless communication, and particularly to methods and systems for feedback in Multiple-Input Multiple-Output (MIMO) communication systems.

BACKGROUND

Various communication systems communicate using multiple transmit and/or receive antennas. Such communication schemes are referred to as Multiple-Input Multiple-Output (MIMO) schemes. MIMO configurations are used, for example, in Evolved Universal Terrestrial Radio Access (E-UTRA), also referred to as Lone Term Evolution (LTE), and LTE-Advanced (LTE-A) systems. MIMO communication typically involves feeding back communication channel information from the receiver to the transmitter.

Some MIMO feedback schemes use precoding codebooks, i.e., predefined sets of precoding matrices that are agreed upon between the transmitter and the receiver. The use of codebooks enables the receiver to report its estimated channel or request a preferable precoding scheme with small signaling overhead. Codebook-based feedback schemes are described, for example, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, which is incorporated herein by reference.

The description above is presented as a general overview of related art in this field and should not be construed as an admission that any of the information it contains constitutes prior art against the present patent application.

SUMMARY

An embodiment that is described herein provides a method including receiving in a mobile communication terminal a precoded Multiple-Input Multiple-Output (MIMO) signal. The precoded MIMO signal includes first and second signal components transmitted at respective different first and second polarizations. A difference between respective signal magnitudes of the first and second signal components received in the terminal is estimated in the terminal. Feedback information, which includes at least an indication of the difference between the signal magnitudes, is calculated and transmitted from the terminal.

In some embodiments, calculating the feedback information includes selecting, based on the received signal, a preferred precoding matrix for precoding subsequent MIMO signals addressed to the terminal, from a predefined codebook including multiple precoding matrices that indicate possible values of the difference between the signal magnitudes.

In a disclosed embodiment, calculating the feedback information includes calculating a long-term feedback component indicative of slowly-varying channel feedback and a short-term feedback component indicative of rapidly-varying channel feedback. In an example embodiment, calculating the long-term feedback component includes reporting the difference between signal magnitudes of the first and second signal components in the long-term feedback component. In another embodiment, calculating the short-term feedback component includes reporting the difference between the signal magnitudes of the first and second signal components in the short-term feedback component. In yet another embodiment, the long-term and short-term feedback components include matrices denoted W1 and W2, respectively, and calculating the feedback information includes calculating a matrix product W2·W1.

In some embodiments, calculating the feedback information includes calculating a first feedback component that is indicative of a steering direction of both the first and the second signal components, and a second feedback component that is indicative of the difference between the signal magnitudes. In an embodiment, calculating the first feedback component includes calculating a common Discrete Fourier Transform (DFT) vector for precoding the first and second signal components. In a disclosed embodiment, calculating the feedback information includes calculating a channel covariance matrix based on the estimated difference between the signal magnitudes.

There is additionally provided, in accordance with an embodiment that is described herein, apparatus including a receiver, processing circuitry and a transmitter. The receiver is configured to receive a precoded Multiple-Input Multiple-Output (MIMO) signal that includes first and second signal components transmitted at respective different first and second polarizations. The processing circuitry is configured to estimate a difference between respective signal magnitudes of the first and second signal components received at the receiver, and to calculate feedback information that includes at least an indication of the difference between the signal magnitudes. The transmitter is configured to transmit the feedback information.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved channel feedback schemes for use in MIMO communication systems. In some embodiments, a base station transmits a MIMO signal to a mobile communication terminal using an array of cross-polarized antennas. The MIMO signal received by the terminal thus comprises two signal components having different (typically orthogonal) polarizations. The terminal uses the received signal to calculate feedback information regarding the MIMO communication channel between the base station and the terminal, and transmits the feedback information to the base station. The terminal transmits the feedback using a scheme in which a composition of feedback possibilities is defined in a codebook that is known to both the terminal and the base station.

In many practical cases, the two signal components may differ in signal magnitude from one another. Significant differences in signal magnitude may occur, for example, when the cross-polarized base station antennas are widely-spaced. In the disclosed embodiments, the terminal estimates the difference between the respective signal magnitudes of the different-polarization signal components, and reports the estimated difference as part of the feedback information.

The base station receives the feedback information as bits in an uplink signal, interprets the bits using a codebook, and then uses the feedback information to configure subsequent MIMO transmissions. The base station uses the feedback information, for example, for selecting precoding schemes for precoding (beam steering) the subsequent transmissions, and for making scheduling decisions. By using feedback information that accounts for the difference in signal magnitude between the different-polarization signal components, the base station is able to configure its subsequent transmissions with a higher degree of accuracy, and thus improve system performance such as throughput and capacity.

Figure 1:
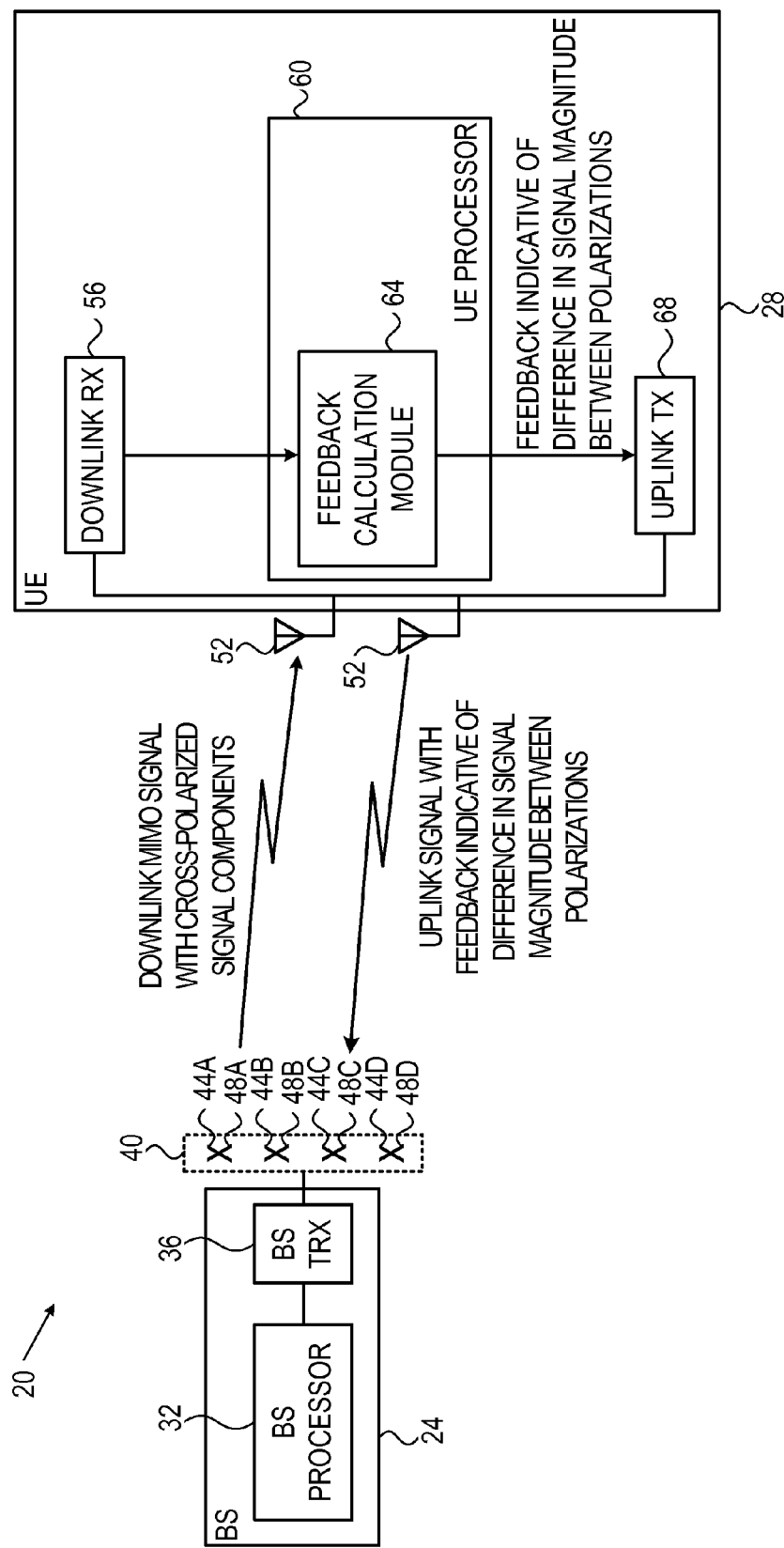
FIG. 1 is a block diagram that schematically illustrates a MIMO communication system, in accordance with an embodiment that is described herein.

FIG. 1 is a block diagram that schematically illustrates a Multiple-Input Multiple-Output (MIMO) communication system 20, in accordance with an embodiment that is described herein. In the present example, system 20 comprises an E-UTRA (LTE) or LTE-Advanced (LTE-A) system that operates in accordance with the TS 36.213 specification, cited above. In alternative embodiments, however, system 20 may operate in accordance with any other suitable communication standard or specification that uses MIMO signals. Other communication standards that use MIMO signals include, for example, UMTS Terrestrial Radio Access (UTRA) systems (also sometimes referred to as Wideband Code Division Multiple Access—WCDMA) and WiMAX systems operating in accordance with IEEE 802.16 specifications.

System 20 comprises a Base Station (BS) 24 (e.g., an LTE eNodeB), which communicates with a mobile communication terminal 28 (also referred to as User Equipment—UE). Although FIG. 1 shows only a single BS and a single UE for the sake of clarity, real-life communication systems typically comprise multiple BSs 24 and multiple UEs 28. BS 24 comprises a BS processor 32, which manages operation of the BS. A BS transceiver (TRX) 36 generates downlink MIMO signals for transmission to UEs 28 and receives uplink signals from the UEs.

BS 24 transmits downlink signals and receives uplink signals using a cross-polarized antenna array 40. In the present example, array 40 comprises a first set of antennas 44A . . . 44D having a certain polarization, and a second set of antennas 48A . . . 48D having a polarization that is orthogonal to the polarization of the first set.

In an example embodiment, one set of antennas is horizontally-polarized and the other set is vertically-polarized. In another example embodiment, one set of antennas has a +45° polarization and the other set has polarization of −45°. Alternatively, any other suitable orthogonal polarizations can be used.

In the present example, array 40 comprises a total of eight antennas, four antennas in each set. The antennas within each set are arranged in a Uniform Linear Array (ULA) configuration, in which the spacing between adjacent antennas is half wavelength ($\lambda/2$).

In another example embodiment, array 40 comprises a total of four antennas, two antennas in each set. The antennas within each set are arranged in a ULA configuration in which the spacing between adjacent antennas is four wavelengths ($4\lambda$). Further alternatively, the antenna array may comprise any suitable number of antennas having any suitable positions.

UE 28 comprises one or more antennas 52, which receive the MIMO downlink signals that are transmitted from BS 24, and transmit uplink signals to the BS. UE 28 comprises a downlink receiver (RX) 56 that receives and demodulates the downlink signals, an uplink transmitter (TX) 68 that generates and transmits the uplink signals, and a UE processor 60 that manages the UE operation and controls the various UE elements.

In some embodiments, UE processor 60 comprises a feedback calculation module 64, which calculates feedback information regarding the downlink communication channels between the BS antennas (44A . . . 44D and 48A . . . 48D) and UE antennas 52. Module 64 calculates the feedback information based on the downlink signals received by downlink receiver 56, e.g., based on reference signals or symbols that are transmitted as part of the downlink signals. Examples of reference signals comprise Common Reference Signals (CRS) in LTE systems, and Channel State Information Reference Signals (CSI-RS) in LTE-A systems. Alternatively, module 64 may calculate the feedback information based on any other suitable part of the received downlink signals. Module 64 provides the calculated feedback information to uplink transmitter 68, and the uplink transmitter transmits the feedback information to BS 24.

The MIMO signal transmitted from BS 24 to a given receiver can be viewed as comprising two signal components having different (typically orthogonal) polarizations. In some embodiments, feedback calculation module 64 calculates the feedback information so as to account for differences in signal magnitude between the different-polarization signal components. This sort of feedback information will be discussed in greater detail below.

In BS 24, BS TRX 36 receives and demodulates the uplink signal, so as to extract the feedback information sent by UE 28. BS processor 32 uses the feedback information to control subsequent downlink transmissions. In an example embodiment, the BS processor sets the downlink precoding scheme (the relative signal phases and amplitudes in the different antennas of array 40) based on the feedback information. Alternatively, the BS processor may use the feedback information to control the downlink transmissions in any other way, such as in making scheduling or channel assignment decisions.

The BS and UE configurations shown in FIG. 1 are example configurations, which are depicted solely for the sake of clarity. In alternative embodiments, any other suitable BS and UE configurations can also be used. Some UE and BS elements that are not mandatory for understanding of the disclosed techniques have been omitted from the figures for the sake of clarity. The different elements of these units are typically implemented using dedicated hardware, such as using one or more Application-Specific Integrated Circuits (ASICs), Radio frequency integrated Circuits (RFIC) and/or Field-Programmable Gate Arrays (FPGAs). Alternatively, some elements may be implemented using software executing on programmable hardware, or using a combination of hardware and software elements.

In some embodiments, some or all of the elements of UE 28 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

The MIMO signal transmitted from BS 24 to UE 28 can be viewed as comprising two signal components having different polarizations. One signal component is transmitted from ULA array 44A ... 44D, and the other signal component is transmitted from ULA array 48A ... 48D. In some practical scenarios, for example when the physical separation between the antennas in each ULA array is large (e.g., 4λ), the signal magnitudes of the two signal components may differ from one another.

In some embodiments, feedback calculation module 64 in UE processor 60 estimates the difference in signal magnitude between the different-polarization components of the received MIMO signal, and calculates the feedback information so as to indicate this difference. In the present context, the term "difference in signal magnitude" refers to additive difference, multiplicative difference (i.e., ratio) or any other suitable way of representing signal magnitudes that differ from one another.

In an embodiment, the feedback information is indicative of a preferred precoding matrix, which is selected by module 64 as preferred for precoding subsequent MIMO signals addressed to UE 28. In an example embodiment, the preferred precoding matrix is given by:

$$W = \begin{bmatrix} m_1 \\ m_2 \alpha \end{bmatrix} \otimes v \qquad \text{Equation 1}$$

wherein $m_1$ and $m_2$ are magnitude terms that capture the difference in signal magnitude between the different-polarization signal components, $\alpha \in \{1, -1, j, -j\}$, $v$ denotes a 2×1 Discrete Frequency Transform (DFT) vector that indicates the beam steering direction for both signal components, and $\otimes$ denotes Kronecker product (also referred to as direct product or tensor product). The example above refers to a total of eight BS antennas, but the preferred precoding matrix can be defined in a similar manner for other numbers of antennas.

In an embodiment, module 64 selects the preferred precoding matrix from a predefined codebook of precoding matrices that is agreed upon in advance between BS 24 and UE 28. Each matrix in the codebook is represented using a certain number of feedback bits—several bits for representing the possible choices of DFT vectors v, plus several bits for representing $m_1$ and $m_2$ or the relationship (e.g., ratio between them).

Consider the case of a codebook for four BS antennas (e.g., two cross-polarized antennas, each comprising a pair of orthogonal-polarization antenna elements). In some embodiments, the codebook used by system 20 is constructed from a set of 2×1 DFT vectors. Define the base 2×1 DFT vector as:

$$u(\theta_k) = \frac{1}{\sqrt{2}}\begin{bmatrix} 1 & e^{j\frac{2\pi}{2^B}k} \end{bmatrix}, k = 0, \ldots, 2^B - 1 \qquad \text{Equation 2}$$

wherein B denotes the number of bits used for representing the DFT vectors.

For rank 1 (i.e., a single precoded transmission sent to the UE per time-frequency resource), the general structure of the code vector takes one of the following forms:

$$W = \frac{1}{\sqrt{1+m^2}}\begin{bmatrix} u(\theta) \\ cmu(\theta) \end{bmatrix} \qquad \text{Equation 3}$$

or $$W = \begin{bmatrix} mu(\theta) \\ c\sqrt{1-m^2}\, u(\theta) \end{bmatrix} \qquad \text{Equation 4}$$

wherein $C \in \{1, -1, j, -j\}$, and $m \in \{m_1, m_2, \ldots, m_2 M_{-1}\}$, M denoting the number of bits used for representing the difference in signal magnitude. The codebook size for rank 1 is thus B+M+2.

For rank 2 (two simultaneous precoded transmissions to the UE per time-frequency resource), the general structure of the code vector takes one of the following forms:

$$W = \frac{1}{\sqrt{2(1+m^2)}}\begin{bmatrix} u(\theta) & u(\theta) \\ cmu(\theta) & -cmu(\theta) \end{bmatrix} \qquad \text{Equation 5}$$

or $$W = \frac{1}{\sqrt{2}}\begin{bmatrix} mu(\theta) & mu(\theta) \\ c\sqrt{1-m^2}\, u(\theta) & -c\sqrt{1-m^2}\, u(\theta) \end{bmatrix} \qquad \text{Equation 6}$$

Generally, the codebook for rank 2 does not necessarily use all possible values of m, c and θ as in rank 1.

In alternative embodiments, feedback calculation module 64 calculates the feedback information by calculating two feedback components—a long-term feedback component (denoted W1) and a short-term feedback component (denoted W2). When using codebook-based feedback, each precoding matrix in the codebook is defined by a respective long-term matrix and a respective short-term matrix.

The long-term feedback component is typically indicative of slowly-varying channel feedback, and is therefore typically computed by module 64 at a relatively coarse time/frequency granularity. The short-term feedback component is typically indicative of rapidly-varying channel feedback, and is therefore typically computed by module 64 at a finer time/frequency granularity.

Typically although not necessarily, the long-term feedback component corresponds to channel correlations between BS antennas of the same polarization. The short-term feedback component, on the other hand, typically corresponds to channel correlations between the two polarizations. Further aspects of this sort of feedback calculation are addressed in U.S. Patent Application Publication 2011/0150052, entitled "MIMO Feedback Schemes for Cross-Polarized Antennas," which is assigned to the assignee of the present patent application and whose disclosure is incorporated herein by reference.

When using such a dual codebook structure, in various embodiments the difference in signal magnitude between the different-polarization signal components can be embedded either in the long-term feedback component W1 or in the short-term feedback component W2.

In embodiments where the difference in signal magnitude is indicated in the lone-term feedback component W1, the rank 1 codebook structure is given by:

$$W = W1 \cdot W2 = \frac{1}{\sqrt{1+m^2}} \begin{bmatrix} u & 0 \\ 0 & mu \end{bmatrix} \begin{bmatrix} 1 \\ c \end{bmatrix} \quad \text{Equation 7}$$

In embodiments where the difference in signal magnitude is indicated in the short-term feedback component W2, the rank 1 codebook structure is given by:

$$W = W1 \cdot W2 = \begin{bmatrix} u & 0 \\ 0 & u \end{bmatrix} \left( \frac{1}{\sqrt{1+m^2}} \begin{bmatrix} 1 \\ mc \end{bmatrix} \right) \quad \text{Equation 8}$$

In embodiments where the difference in signal magnitude is indicated in the long-term feedback component W1, the rank 2 codebook structure is given by:

$$W = W1 \cdot W2 = \frac{1}{\sqrt{2(1+m^2)}} \begin{bmatrix} u & 0 \\ 0 & mu \end{bmatrix} \begin{bmatrix} 1 & 1 \\ c & -c \end{bmatrix} \quad \text{Equation 9}$$

In embodiments where the difference in signal magnitude is indicated in the short-term feedback component W2, the rank 2 codebook structure is given by:

$$W = W1 \cdot W2 = \begin{bmatrix} u & 0 \\ 0 & u \end{bmatrix} \left( \frac{1}{2(1+m^2)} \begin{bmatrix} 1 & 1 \\ mc & -mc \end{bmatrix} \right) \quad \text{Equation 10}$$

In an example embodiment, W2 is allocated four bits in the feedback information and m is given by [1 0.75 0.9 1.2]. In another embodiment, W2 is allocated three bits in the feedback information and the one-bit codebook for in is [1 0.75]. Several examples of simulated performance of the above feedback schemes, for various types of BS antenna arrays and bit allocations for W1 and W2, are given in U.S. Provisional Patent Application 61/556,752, cited above.

Typically, the term u in the above equations has long-term slowly-varying characteristics. Nevertheless, in some embodiments module 64 fine-tunes the term u as part of the short-term feedback component W2. In an example embodiment, W1 comprises overlapping adjacent bins for reducing edge effects in frequency-selective feedback. In this embodiment, module 64 generates $2^{B1+B2}$ DFT vectors. Each W1 matrix thus comprises $2^{B2}$ DFT vectors arranged in columns:

$$W1 = \begin{bmatrix} u_1 & u_2 & \ldots & u_{B_2} & 0 & 0 & 0 & 0 \\ 0 & 0 & 0 & 0 & mu_1 & mu_2 & \ldots & mu_{B_2} \end{bmatrix} \quad \text{Equation 11}$$

W2 in this embodiment comprises a column selector matrix with a phase combiner:

$$W2 \in C_2 = \quad \text{Equation 12}$$

$$\left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

wherein $Y \in \{e_1, e_2, \ldots, e_{B_2}\}$, $\tilde{e}_i$ denoting a selection of the $i^{th}$ column. In some embodiments, module 64 applies suitable scaling factors for normalizing the preceding matrices.

In alternative embodiments, the difference in signal magnitude is captured in the short-term feedback component:

$$W1 = \begin{bmatrix} u_1 & u_2 & \ldots & u_{B_2} & 0 & 0 & 0 & 0 \\ 0 & 0 & 0 & 0 & u_1 & u_2 & \ldots & u_{B_2} \end{bmatrix} \quad \text{Equation 13}$$

$$W2 \in C_2 = \quad \text{Equation 14}$$

$$\left\{ \frac{1}{\sqrt{2}} \begin{bmatrix} Y \\ mY \end{bmatrix}, \frac{1}{\sqrt{2}} \begin{bmatrix} Y \\ jmY \end{bmatrix}, \frac{1}{\sqrt{2}} \begin{bmatrix} Y \\ -mY \end{bmatrix}, \frac{1}{\sqrt{2}} \begin{bmatrix} Y \\ -jmY \end{bmatrix} \right\}$$

wherein $Y \in \{e_1, e_2, \ldots, e_{B_2}\}$ and $m \in \{m_1, m_2, \ldots, m_{2^{M-1}}\}$.

In other embodiments, the codebook used by system 20 is an adaptive codebook, in which the channel covariance matrix serves as the long-term feedback component W1, and the short-term feedback component W2 is selected from some base codebook. In these embodiments, the codebook is optimized for cross-polarized BS antenna configurations. In an example embodiment, feedback calculation module 64 calculates the covariance matrix by averaging the instantaneous channel covariance over time and frequency:

$$R = \sum_{f,t} H^*(f,t) H(f,t) \quad \text{Equation 15}$$

For cross-polarized BS antennas, this covariance matrix can be approximated as the following structure:

$$R_{struct} = \begin{bmatrix} R_{ULA} & 0 \\ 0 & mR_{ULA} \end{bmatrix} \quad \text{Equation 16}$$

wherein $R_{ULA}$ denotes the intra-polarization covariance matrix. The parameter m accounts for the difference in signal magnitude between the different-polarization signal components.

For the co-polarized part, in an embodiment, the covariance matrix R is closely approximated by a single correlation parameter $\alpha$ given by $R_{ULAij} = \alpha^{|i-j|}$. In these embodiments, the codebook entries are essentially parameterized by the complex quantity $\alpha$ and the real parameter m. The W2 codebook may comprise a DFT-based codebook, or a subset of a Householder codebook (possibly the entire Householder codebook). In example embodiments, possible codebooks for in and $\alpha$ are $m \in \{0.6, 0.8, 1, 1.3\}$, $|\alpha| = \{0.9, 1\}$, and eight uniformly quantized phases in the interval $[0, 2\pi)$ for $\alpha$.

In alternative embodiments, the precoding matrix has the form $W = W2 \cdot W1$. In an embodiment, W1 comprises the Householder codebook. In embodiments where the difference in signal magnitude is embedded in the long-term feedback component W1, the Householder code-words of W1 are scaled accordingly with a diagonal matrix D. W2 in these embodiments may comprise a DFT vector or a co-phasing vector of the form $[1 \ 1 \ c \ c]^T$. In embodiments where the difference in signal magnitude is embedded in the short-term feedback component W2, W2 is scaled by a diagonal matrix of the form $D = \text{diag}(1 \ 1 \ m \ m)$.

The codebooks, precoders and feedback schemes described above are chosen solely by way of example. In alternative embodiments, UE 28 may calculate and transmit any other suitable type of feedback information that is indicative of the difference in signal magnitude between the different-polarization signal components. BS 24 may use this feedback to implement any other suitable precoding scheme and/or for any other purpose.

Figure 2:
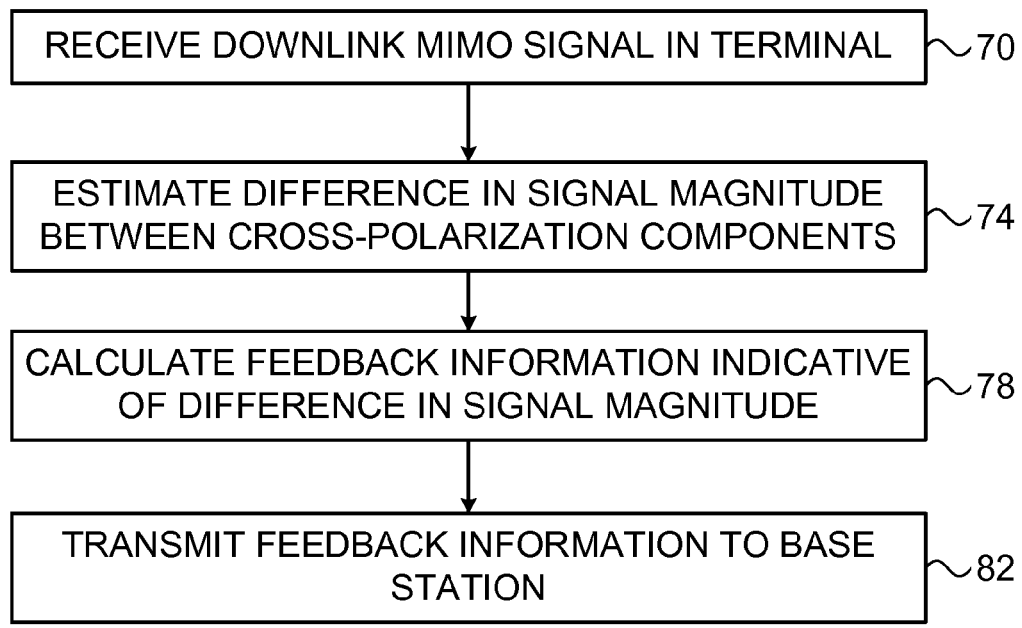
FIG. 2 is a flow chart that schematically illustrates a method for feedback in a MIMO communication system, in accordance with an embodiment that is described herein.

FIG. 2 is a flow chart that schematically illustrates a method for feedback in system 20, in accordance with an embodiment that is described herein. The method begins with receiver 56 of UE 28 receiving a downlink MIMO signal from BS 24, at a reception operation 70. The received signal comprises two signal components having different (typically orthogonal) polarizations.

Feedback calculation module 64 in UE processor 60 estimates the difference in signal magnitude between the two signal components, at a magnitude difference estimation operation 74. Module 64 then calculates feedback information that is indicative of the estimated difference in signal magnitude, at a feedback calculation operation 78. Transmitter 68 transmits the feedback information from UE 28 to BS 24, at a feedback transmission operation 82. BS 24 uses the feedback information to configure subsequent transmissions to the UE.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving in a mobile communication terminal from a base station a precoded Multiple-Input Multiple-Output (MIMO) signal, which comprises a first signal component transmitted by one or more first antennas of the base station at a first polarization, and further comprises a second signal component transmitted by one or more second antennas of the base station at a second polarization, different from the first polarization;
estimating in the terminal a difference between respective signal magnitudes of the first signal component having the first polarization and the second signal component having the second polarization that have been received in the terminal, and calculating feedback information that requests the base station to precode subsequent MIMO signals with a precoding matrix that is specified as a function of the difference between the signal magnitudes; and
transmitting the feedback information from the terminal.

2. The method according to claim 1, wherein calculating the feedback information comprises selecting the precoding matrix, based on the received signal, from a predefined codebook comprising multiple precoding matrices that indicate possible values of the difference between the signal magnitudes.

3. The method according to claim 1, wherein calculating the feedback information comprises calculating a long-term feedback component indicative of slowly-varying channel feedback and a short-term feedback component indicative of rapidly-varying channel feedback.

4. The method according to claim 3, wherein calculating the long-term feedback component comprises reporting the difference between signal magnitudes of the first and second signal components in the long-term feedback component.

5. The method according to claim 3, wherein calculating the short-term feedback component comprises reporting the difference between the signal magnitudes of the first and second signal components in the short-term feedback component.

6. The method according to claim 3, wherein the long-term and short-term feedback components comprise matrices denoted W1 and W2, respectively, and wherein calculating the feedback information comprises calculating a matrix product W2·W1.

7. The method according to claim 1, wherein calculating the feedback information comprises calculating a first feedback component that is indicative of a steering direction of both the first and the second signal components, and a second feedback component that is indicative of the difference between the signal magnitudes.

8. The method according to claim 7, wherein calculating the first feedback component comprises calculating a common Discrete Fourier Transform (DFT) vector for precoding the first and second signal components.

9. The method according to claim 1, wherein calculating the feedback information comprises calculating a channel covariance matrix based on the estimated difference between the signal magnitudes.

10. Apparatus, comprising:
a receiver, which is configured to receive from a base station a precoded Multiple-Input Multiple-Output (MIMO) signal that comprises a first signal component transmitted by one or more first antennas of the base station at a first polarization, and further comprises a second signal component transmitted by one or more second antennas of the base station at a second polarization, different from the first polarization;
processing circuitry, which is configured to estimate a difference between respective signal magnitudes of the first signal component having the first polarization and the second signal component having the second polarization that have been received at the receiver, and to calculate feedback information that requests the base station to precode subsequent MIMO signals with a precoding matrix that is specified as a function of the difference between the signal magnitudes; and
a transmitter, which is configured to transmit the feedback information.

11. The apparatus according to claim 10, wherein the processing circuitry is configured to calculate the feedback information by selecting the precoding matrix, based on the received signal, from a predefined codebook comprising multiple precoding matrices that indicate possible values of the difference in signal magnitude.

12. The apparatus according to claim 10, wherein the processing circuitry is configured to calculate the feedback information by calculating a long-term feedback component indicative of slowly-varying channel feedback and a short-term feedback component indicative of rapidly-varying channel feedback.

13. The apparatus according to claim 12, wherein the processing circuitry is configured to report the difference between the signal magnitudes of the first and second signal components in the long-term feedback component.

14. The apparatus according to claim 12, wherein the processing circuitry is configured to report the difference between the signal magnitudes of the first and second signal components in the short-term feedback component.

15. The apparatus according to claim 12, wherein the long-term and short-term feedback components comprise matrices denoted W1 and W2, respectively, and wherein the processing circuitry is configured to calculate the feedback information by calculating a matrix product W2·W1.

16. The apparatus according to claim 10, wherein the processing circuitry is configured to calculate a first feedback component that is indicative of a steering direction of both the first and the second signal components, and a second feedback component that is indicative of the difference between the signal magnitudes.

17. The apparatus according to claim 16, wherein the processing circuitry is configured to calculate the first feedback component by calculating a common Discrete Fourier Transform (DFT) vector for precoding the first and second signal components.

18. The apparatus according to claim 10, wherein the processing circuitry is configured to calculate the feedback information by calculating a channel covariance matrix based on the estimated difference between the signal magnitudes.

19. A mobile communication terminal comprising the apparatus of claim 10.

20. A chipset for processing signals in a mobile communication terminal, comprising the apparatus of claim 10.

\* \* \* \* \*